(12) United States Patent
Petteruti et al.

(10) Patent No.: US 6,292,595 B1
(45) Date of Patent: *Sep. 18, 2001

(54) IMAGE RECORDING DEVICE

(75) Inventors: Steven F. Petteruti, E. Greenwich; Roy P. Lyman, Johnston, both of RI (US); Richard A. Perry, Charlotte, NC (US)

(73) Assignee: ZIH Corporation, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/862,117

(22) Filed: May 22, 1997

(51) Int. Cl.[7] .................................................. G06K 9/22
(52) U.S. Cl. ........................................... 382/313; 358/473
(58) Field of Search .................................. 358/473, 474, 358/479, 443, 407, 434, 436, 438; 382/313, 314, 312, 315, 311; 348/552, 553

(56) References Cited

U.S. PATENT DOCUMENTS

| | | | |
|---|---|---|---|
| 3,925,639 | * | 12/1975 | Hester ................................ 235/61.11 |
| 4,002,886 | * | 1/1977 | Sundelin ......................... 235/61.7 R |
| 4,250,488 | * | 2/1981 | Haupt .................................... 250/205 |
| 4,500,880 | * | 2/1985 | Gomersall ....................... 340/825.35 |
| 4,543,615 | * | 9/1985 | Van Campenhout et al. ....... 358/285 |
| 4,866,535 | * | 9/1989 | Kuboto et al. ....................... 358/474 |
| 4,887,165 | * | 12/1989 | Sato et al. ............................ 358/474 |
| 5,018,026 | * | 5/1991 | Takada ................................. 358/473 |
| 5,121,226 | * | 6/1992 | Kubota et al. ....................... 358/473 |
| 5,151,684 | * | 9/1992 | Johnson ............................... 340/572 |
| 5,335,090 | * | 8/1994 | Yamada et al. ...................... 358/473 |
| 5,537,312 | * | 7/1996 | Sekiguchi ......................... 364/401 R |
| 5,595,445 | * | 1/1997 | Bobry .................................. 358/473 |
| 5,640,002 | * | 6/1997 | Ruppert ............................... 235/472 |
| 5,659,761 | * | 8/1997 | DeArras et al. ...................... 395/750 |
| 5,684,705 | * | 11/1997 | Herbert ............................ 364/464.11 |
| 5,729,807 | * | 3/1998 | Parker ................................... 399/285 |

OTHER PUBLICATIONS

"Food Market Institutes Marketechnics" by Display Edge Technology; 1999.*
J&R Music World Computer World Spring 1997 Catalog; Cover page and p. 151.
Logitech ScanMan Color 2000 Complete Software Installation Kit manual; Entire manual (1996).
Nuclear Instruments and Methods in Physics Research B21 (1987) pp. 264–269; H.F. Glavish, et al.; "Production High Energy Ion Implanters Using Radio Frequency Acceleration".
Nuclear Instruments and Methods in Physics Research B21 (1987) pp. 218–223; H.F. Glavish; "Radio–Frequency Linear Accelerators For Ion Implanters".
Atomic Data 5, pp. 113–166 (1973); A.B. Wittkower et al; "Equilibrium–Charge–State Distributions of Energetic Ion (Z>2) In Gaseous and Solid Media".
NSG America, Inc., "Selfoc Lens Array (SLA) Reference Book", *Technical Notes—Selfoc Lens Array*, 23 pp.

(List continued on next page.)

*Primary Examiner*—Jerome Grant
(74) *Attorney, Agent, or Firm*—Testa, Hurwitz & Thibeault, LLP

(57) ABSTRACT

A portable hand-held image recording device for generating and storing information representative of a two dimensional image includes a compact image scanning apparatus, a microprocessor, memory, and associated control software. The compact image scanning apparatus includes a light emitting diode array to provide a source of light, a focusing element to create a scan line on the image, a lens array to transmit light reflected off of the image, and an image sensor to convert the light reflected off of the image into electronic information. A scanning subassembly is provided to accurately track movement of the recording device across the image and to incrementally scan discrete portions of the image by controlling energization of the light emitting diode array.

10 Claims, 13 Drawing Sheets

OTHER PUBLICATIONS

NSG America, Inc., *Selfoc Lens Array Specification Update*, 4 p. (Jun. 1996).

"512 Pixel Linear Array Replaces CCD", *Optoelectronics*, 1 p. (Sep. 1995).

\* cited by examiner

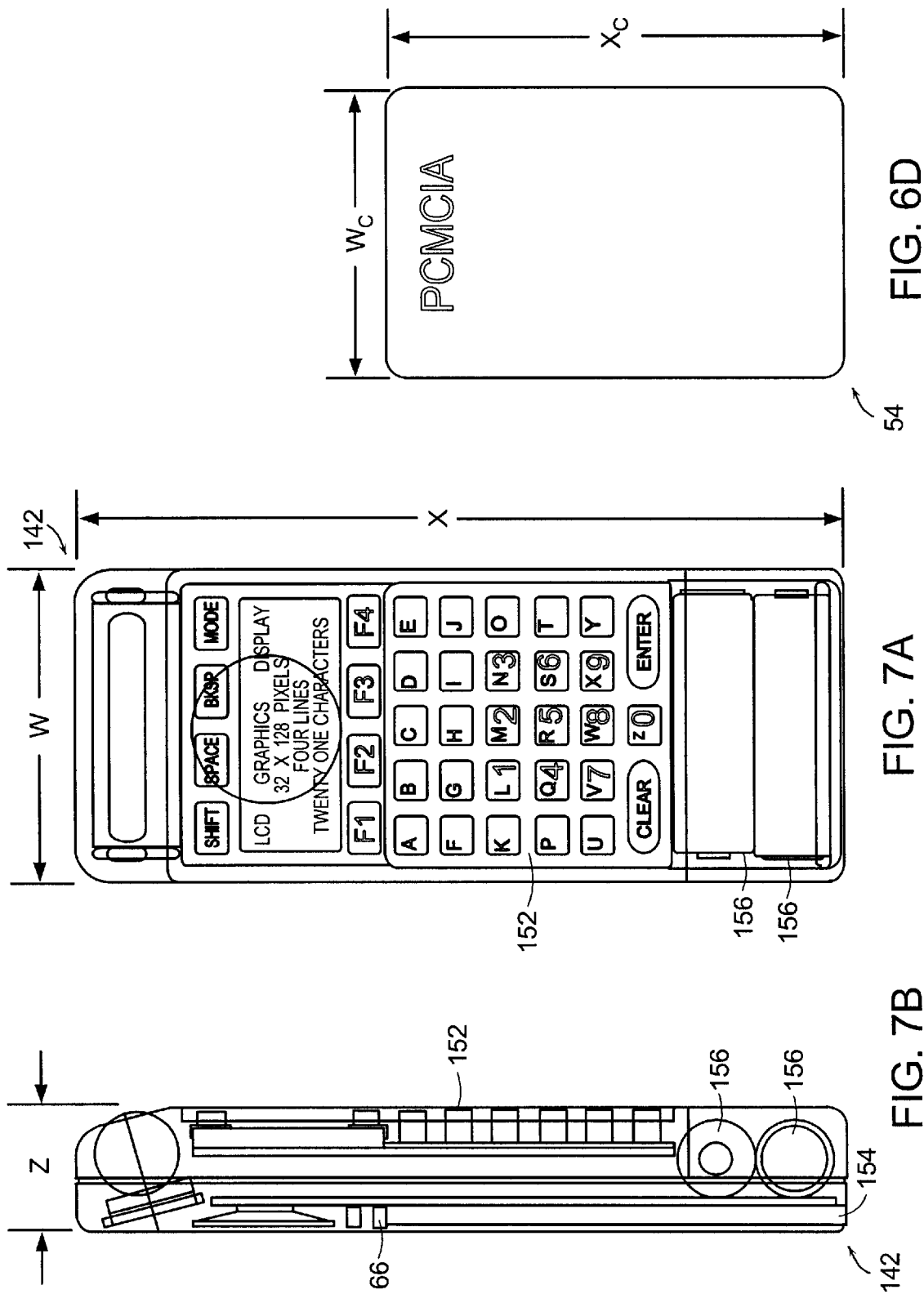

IMAGE RECORDING DEVICE

TECHNICAL FIELD

The present invention relates to image recording devices and, more specifically, to a portable hand-held device for recording and storing information representative of a two dimensional image. The device includes the capability to communicate with a base station for transmitting information, such as data, and receiving information, such as software control algorithms.

BACKGROUND

Automated recording of information from distributed locations and transmittal of the recorded information to a central repository is becoming increasingly important in tracking delivery of goods and services, as well as location of inventory in retail, warehouse, and other distributed storage locations. The capability to locate specific items of inventory or verify delivery of specific items to a specific location in near real time can provide significant competitive advantage to a service enterprise. Progress has been made in recent years to achieve these goals.

For example, commercial parcel delivery services originally employed handwritten methods for recording receipt of a parcel from a customer, delivery of the parcel through a number of intermediate handlers at various geographic locations, and ultimately acceptance of the parcel by the addressee. Tracking of the parcel to locate a misdelivered or undelivered parcel was costly, time consuming, and error prone, requiring manual review of handwritten, often illegible records of each intermediate handler. The advent of coding each parcel with an individualized bar code or other indicia, scanning the bar code at each intermediate handler with a light pen, and uploading the bar code information to a networked computer system reduced the cost, time, and errors associated with parcel tracking. Machine readable indicia such as bar codes affixed to the parcels on adhesive labels are subject to soiling and handling damage, however, which can prevent accurate scanning of the bar code by the light pen and result in read errors which reduce efficiency of the system.

Other improvements such as electronic pads have been introduced to verify acceptance of the parcel by the addressee. With these devices, when the addressee signs for the parcel, a plot of their signature is generated due to the impression made by the addressee on the electronic pad. The signature, in electronic format, can be uploaded to the networked computer system to provide additional information for verification purposes. Such pads, however, are prone to damage, being subjected to repetitive, irregular contact forces. Additionally, parcel delivery persons are required to employ both light pens and electronic pads to support the system.

SUMMARY OF THE INVENTION

According to the invention, an image scanning apparatus is useful in a wide variety of applications including, but not limited to, an image recording device used in combination with a computer system for providing tracking information for goods and services. The image scanning apparatus can be used to scan all manner of two dimensional images including, for example, alphanumeric characters, symbols, bar codes, handwritten signatures, and other indicia capable of being represented in two dimensional format.

The image scanning apparatus includes an image sensor such as a photodiode array or charge coupled device ("CCD") array. A lens array is disposed between the image sensor and the image to be scanned to provide high resolution transmission of the image to the image sensor in a more compact arrangement than typically possible with conventional lens optical systems. A light source, such as a light emitting diode ("LED") array, is also provided for illuminating the image. In an exemplary embodiment, the image scanning apparatus also includes a tracking element such as a ball, roller, or wheel configured for rolling contact on the image for indicating movement of the apparatus relative to the image. A switching feature coupled to the tracking element flashes the light source in accordance with relative movement of the image so that a series of discrete, sequential portions of the image are transmitted to the image sensor. Accordingly, as the image scanning apparatus is passed over an image, the visual indicia of the image is sequentially transformed into electronic information.

In one embodiment, the image scanning apparatus is disposed in a small, lightweight, portable hand-held device for recording an image and storing the recorded image as electronic information. The recording device may include a microprocessor for receiving output of the image scanning apparatus representative of the image, memory for storing information for subsequent retrieval, and software for controlling operation of the recording device. A programmable device such as a field programmable gate array ("FPGA") may also be included in the recording device between the image scanning apparatus and the microprocessor to facilitate reconfiguration of the recording device to perform a different task. The memory may be flash memory, such as a removable Personal Computer Memory Card International Association ("PCMCIA") card, a Compact Flash card, or a Miniature Card to facilitate replacement thereof or uploading of stored information. The recording device may also have a variety of data input devices in addition to the image scanning apparatus, as well as a variety of data output devices. For example, the recording device may include an alphanumeric keyboard for manual data input, a microphone for oral data input, and a contact or non-contact communications port for receiving data from a base station or host computer. Data output devices may include a display or a printer for respectively displaying or printing symbols, graphics, or man readable code, a speaker for aural output, and a contact or non-contact communications port for transmitting data to a base station or host computer. To facilitate portability, the recording device may further include a source of power such as a rechargeable battery.

The recording device may be used in a stand alone mode for recording, storing, and displaying an image, or may be used in an image recording system. The system may include a base station which communicates with the recording device via the communication port. Information stored in the recording device representative of one or more scanned images may be uploaded to the base station and information such as control algorithms and other software for programming the FPGA and controlling operation of the recording device may be downloaded to the recording device. In one embodiment the base station may also include a power supply configured to recharge the battery of the recording device. The image recording system may also include a host computer for communicating with one or more recording devices directly, or indirectly through one or more base stations.

According to a method of the invention for recording an image, at least a portion of the image is illuminated. Information representative of the illuminated portion is generated and stored. A next portion of the image is then illuminated and representative information generated and stored. The steps are repeated until information representative of the entire image has been generated and stored. Uploading of information representative of an image to the base station and/or the host computer may occur at any time after at least some information has been generated.

Other associated data such as time of day, geographic location, spoken words, and the like may be input and stored with the image information at the time the information is generated, for example. This associated data may be retained in the recording device or uploaded to the base station and/or host computer, as desired.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which:

FIG. 6D is a schematic plan view of a PCMCIA card;

FIG. 7A is a schematic partial phantom plan view of a recording device in accordance with an alternative embodiment of the present invention;

FIG. 7B is a schematic partial phantom left side view of the recording device depicted in FIG. 7A;

DESCRIPTION

Figure 1A:
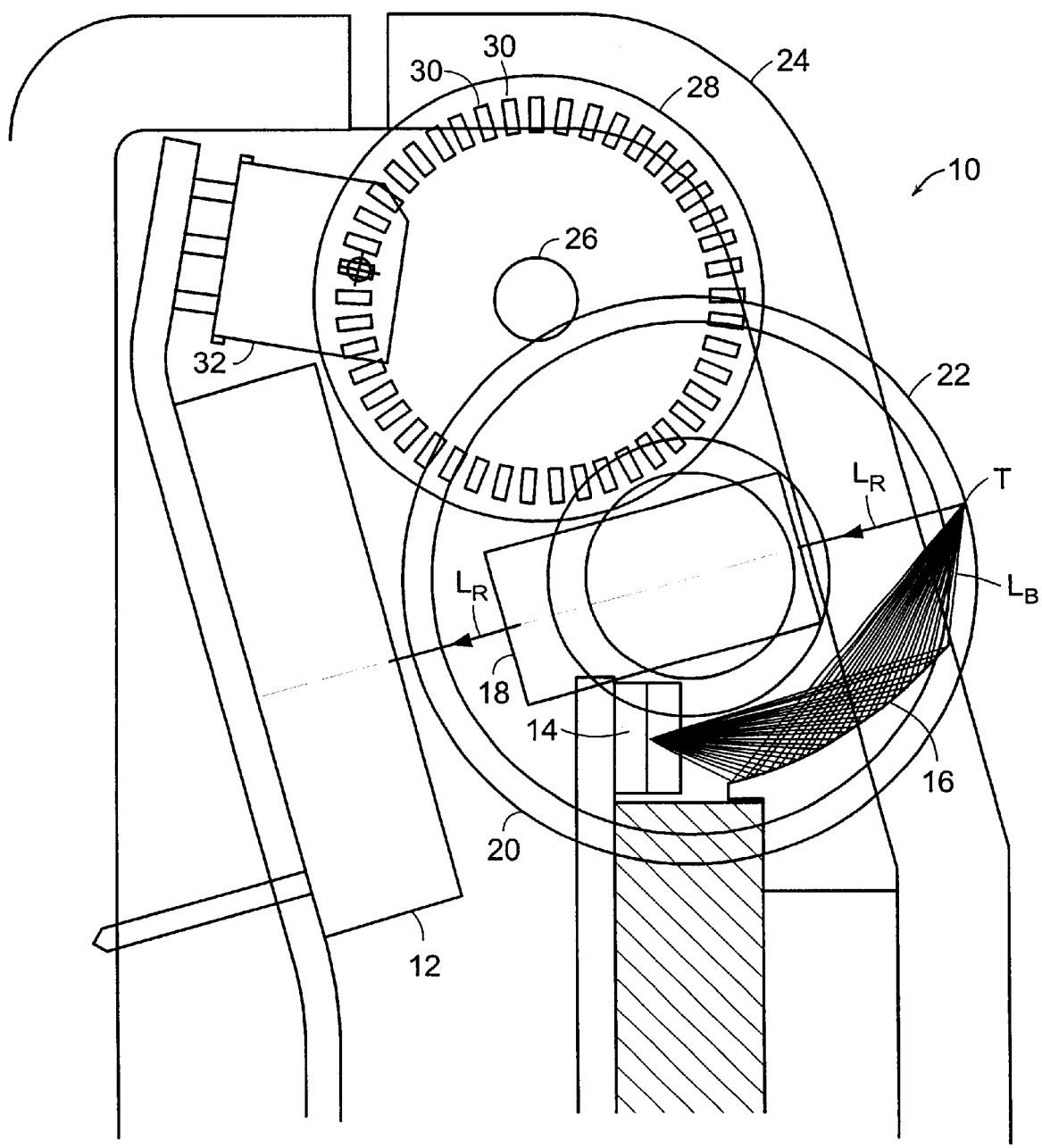
FIG. 1A is an enlarged schematic partial phantom side view of an image scanning apparatus in accordance with an embodiment of the present invention.

FIG. 1A shows an enlarged schematic partial phantom left side view of an image scanning apparatus 10 in accordance with an embodiment of the present invention. The image scanning apparatus 10 includes an image sensor 12 such as a photodiode array or a CCD array which converts light impinging thereon into an electrical signal, the magnitude of which is a function of the intensity of the impinging light. In an exemplary embodiment, a low intensity light beam would produce a signal having a first magnitude; whereas, a higher intensity light beam would produce a signal having a second, greater magnitude. As depicted in FIG. 1A, solely an end face of the image sensor 12 is depicted, it being understood that the image sensor 12 extends in a direction substantially perpendicular to the plane of the figure.

A light source such as LED array 14 provides a substantially constant intensity light beam for illuminating a portion of the image to be scanned. Similar to the configuration of the image sensor 12, the LED array 14 extends in a direction substantially perpendicular to the plane of the figure. To provide for uniform illumination of a discrete portion of the image, a focusing element such as reflective surface 16 is provided. The function of the reflective surface 16, which also extends in a direction substantially perpendicular to the plane of the figure, is to capture the diverging light beams emitted from the LED array 14 and focus the light beams, shown generally at $L_B$, so that they converge at a spatial location referred to as a target, T. As is known by those skilled in the art of optical design, focusing elements can be employed to generate a variety of light beam targets including point light targets and linear light targets. According to an exemplary embodiment of the present invention, the light beams, $L_B$, from the LED array 14 converge to form a linear light target, T, disposed generally perpendicular to the plane of FIG. 1A. The spatial location of the target, T, coincides with the generally planar surface of the image to be scanned, as will be discussed in greater detail hereinbelow.

Figure 1B:
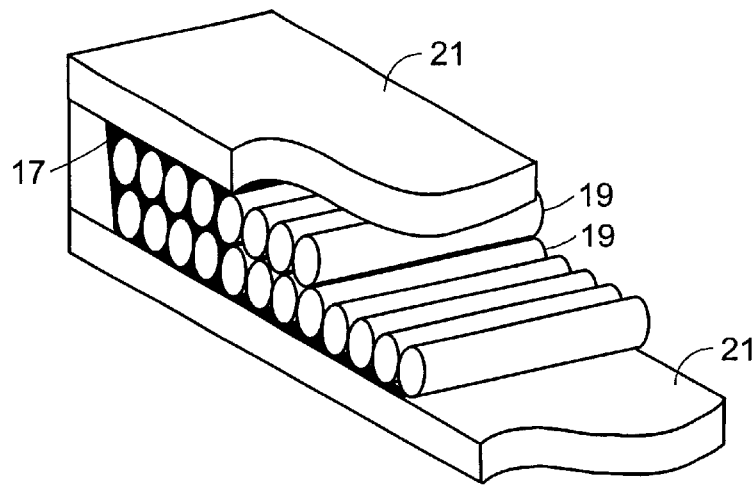
FIG. 1B is an enlarged partially broken away perspective view of the lens array employed in the image scanning apparatus depicted in FIG. 1A.

Light reflected off of the surface of the image, shown generally at $L_R$, passes through a lens array 18, which is a compact optical device for high resolution, low loss, low distortion transmission of light. As depicted in FIG. 1A, solely an end face of the lens array 18 is depicted, it being understood that the lens array 18 extends in a direction substantially perpendicular to the plane of the figure. FIG. 1B shows the lens array 18 in more detail. The lens array 18 depicted includes two rows of graded-index glass micro lenses 19 configured as right circular cylinders, although a single row could be employed or additional rows could be employed to produce an image with more uniform light distribution. The micro lenses 19 are resiliently mounted in a silicon resin 17 and aligned precisely between two fiberglass reinforced polymer plates 21 to produce a substantially rigid, lightweight assembly. Thermally induced distortion and stress may be minimized by matching the coefficient of thermal expansion of the plates 21 to the glass micro lenses 19. The micro lenses 19 exhibit substantially identical optical properties and are manufactured to close geometric and material tolerances to minimize image transmission variability from one micro lens 19 to the next. In an exemplary embodiment, the silicon resin is black in color to minimize transmitted light flare or crosstalk between respective micro lenses 19.

The lens array 18 according to this construction transmits a 1:1 size ratio, non-inverted optical image with minimal peripheral distortion. Accordingly, the distance between the image sensor 12 and the target, T, can be very short. In an exemplary embodiment for the configuration depicted in FIG. 1A, the transmitted light distance between the image sensor 12 and the target is about 0.575 inches at a light wavelength of 660 nm. Different transmitted light distances result from the use of different light wavelengths. Upon exiting the lens array 18, the reflected light, $L_R$, impinges on the image sensor 12, generating an electrical output signal representative thereof Since the reflected light, $L_R$, is in the form of a plane, due to the nature of the lens array 18 and the linear light target, T, the output signal is also a function of the resolution of the image sensor 12. An exemplary image sensor 12 may have a linear resolution of about 400 elements per inch in the transverse direction, substantially perpendicular to the plane of the figure. In other words, about 400 discrete points of image information per inch are generated along the target, T.

Once the output signal for the target, T, is generated, the information representative of that discrete portion of the image is stored, as will be discussed in greater detail hereinbelow, and a next portion of the image can be scanned. One method of controlling image scanning is to regulate energization of the LED array 14, for example, by flashing the LED array 14 as the image to be scanned is moved relative to the image scanning apparatus 10. Information representative of each scan line is generated and stored until the entire image has been stored.

A tracking element such as a wheel 20 is journaled for rotation such that a portion of the wheel periphery 22 is exposed for rolling contact on the image. As can be seen in FIG. 1A, the spatial location of the target, T, is coincident with the wheel periphery 22 generally at maximum radial exposure from a surrounding housing 24. In an exemplary embodiment depicted in FIG. 2A, two wheels 20 are employed in axially spaced relation to provide for stable rolling.

Referring again to FIG. 1A, the wheel periphery 22 frictionally drives a shaft 26 on which is mounted an optical disk 28 having a plurality of angularly equispaced apertures or slots 30 disposed therethrough. In an alternative embodiment for applications where a more positive drive system is desired, one or more gears may be employed as discussed in greater detail hereinbelow with respect to FIGS. 4, 5A, and 5B. Forty-five slots 30 are shown in the optical disk 28 in the embodiment depicted in FIG. 1A. A photo interrupter such as a light transmitter and detector, shown generally at 32, is provided which straddles the optical disk 28 at the radial location of the slots 30. Accordingly, as the optical disk 28 is driven by rotation of the wheels 20, the slots 30 passing through the photo interrupter 32 generate a timing signal representative of the motion of the image scanning apparatus 10 relative to the image. The timing signal may be used advantageously to control energization of the LED array 14. Accordingly, irrespective of the speed with which the image scanning apparatus 10 is tracked or rolled across an image to be scanned, a constant number of lines per inch will be scanned in the travel direction. The number of lines per inch or resolution of the image scanning apparatus 10 in the travel direction can be varied by changing the diameter of the shaft 26, the gear ratio of a gear driven embodiment, or the number of slots 30 on the disk 28. Alternatively or additionally, the control algorithm may be changed so that passage of two or more slots or both the leading and trailing edges of each slot is required to energized and/or deenergize the LED array 14. Accordingly, the image can be scanned to the desired resolution in both transverse and travel directions by selecting an appropriate resolution image sensor 12 and the appropriate photo interrupter control scanning algorithm, respectively.

Other scanning algorithms are also contemplated. For example, instead of using the photo interrupter timing signal to control the LED array 14, the LED array 14 could be continuously energized, with the timing signal used to control capture and storage of image sensor output. Alternatively, the time period of the LED flash may be varied to control the total light energy during the image sensor integration time, which may be considered as the shutter speed on a camera. By controlling energization of the LED array 14, however, energy may be conserved, which may be important in portable hand-held battery powered image recording devices which employ the image scanning apparatus 10.

Figure 2A:
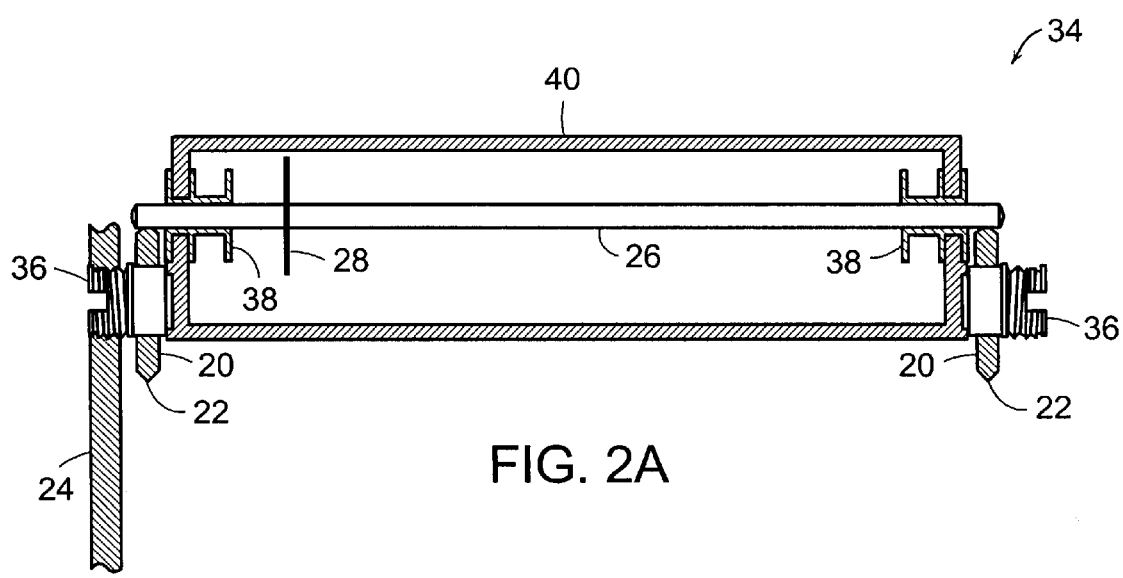
FIG. 2A is a schematic sectional plan view of a subassembly for incrementally scanning discrete portions of an image.
Figure 2B:
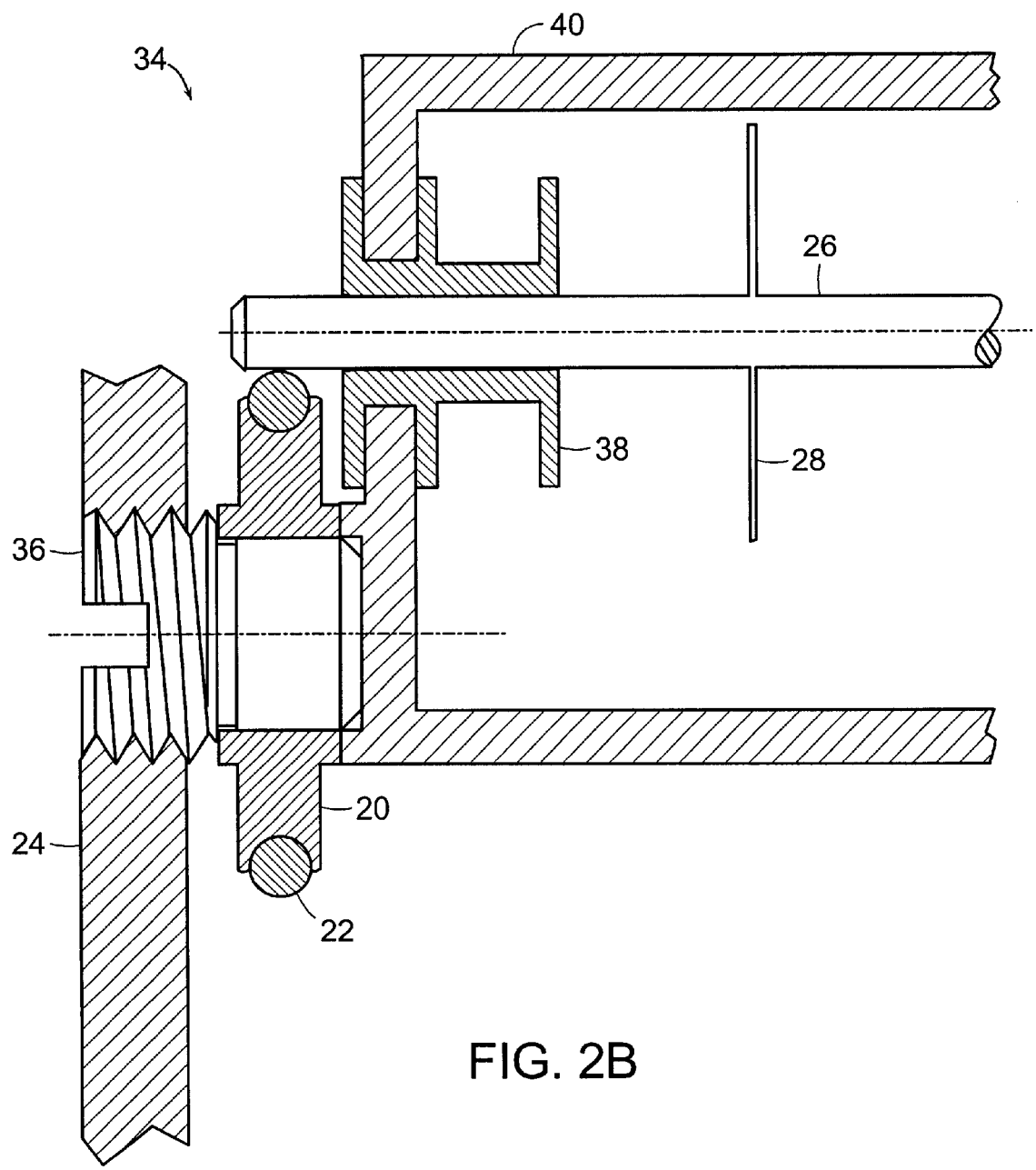
FIG. 2B is an enlarged schematic plan view of a portion of the subassembly depicted in FIG. 2A.

Referring again to FIG. 2A, depicted is a schematic sectional plan view of a subassembly 34 for incrementally scanning discrete portions of an image. Shoulder screws 36 thread into the housing 24, solely a portion of which is depicted. The shoulder portions of the screws 36 support the wheels 20 for rotation. Shaft 26, upon which optical disk 28 is mounted, is journaled for free rotation by flanged bushings 38 disposed at respective ends thereof The bushings 38 are disposed in an opaque cover 40 provided to keep extraneous light and debris such as dust from entering and affecting operation of the image scanning apparatus 10. Note that the photo interrupter 32, image sensor 12, LED array 14, reflective surface 16, and lens array 18 have been deleted for clarity in this view. As depicted in FIG. 2A and seen more clearly in FIG. 2B, which is an enlarged schematic plan view of a portion of the subassembly 34 depicted in FIG. 2A, the periphery 22 of each wheel 20 is fitted with a friction member such as an O-ring to prevent slippage of the wheels 20 on the shaft 26 and the image as the image scanning apparatus 10 is rolled across the image. As mentioned hereinabove, a gear drive may be used to prevent the possibility of slippage between wheel 20 and optical disk shaft 26.

Figure 3:
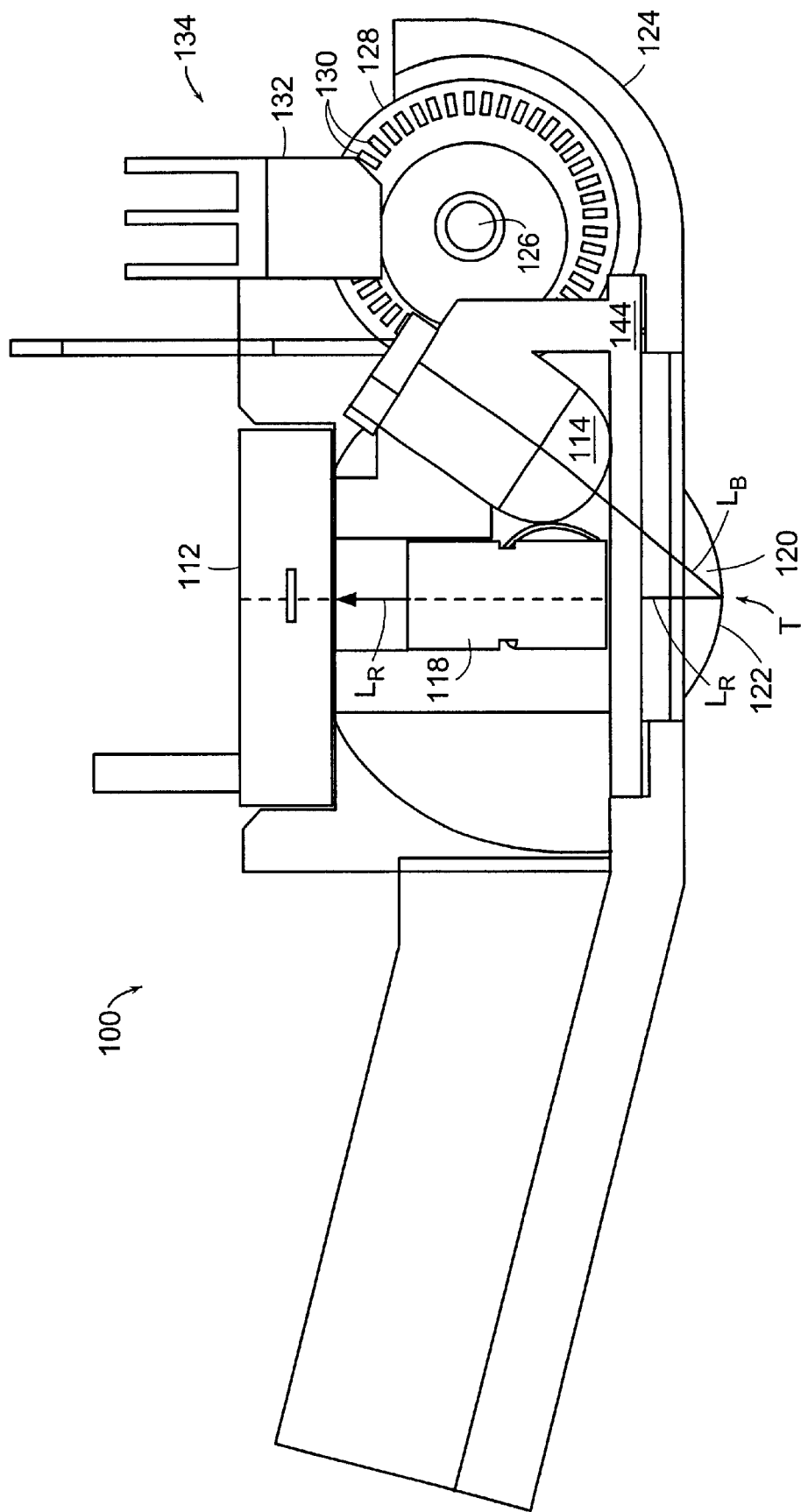
FIG. 3 is an enlarged schematic sectional side view of an image scanning apparatus in accordance with an alternative embodiment of the present invention.

Depicted in FIG. 3 is an enlarged schematic sectional side view of an image scanning apparatus 100 in accordance with an alternative embodiment of the present invention in which gears are used to provide positive drive to the optical disk shaft 126 to generate timing signal information, as will be discussed in greater detail hereinbelow. Generally, the image scanning components described with respect to FIG. 3 are substantially similar to similarly designated components of FIG. 1A The image scanning apparatus 100 includes an image sensor 112 such as a photodiode array or a CCD array, a light source such as an LED array 114, and an optional focusing element which may be integral with an optically clear window 144. The light beams, shown generally at $L_B$, illuminate the linear target, T, disposed substantially perpendicular to the plane of FIG. 3. The spatial location of the target, T, coincides with the generally planar surface of the image to be scanned.

Light reflected off of the surface of the image, shown generally at $L_R$, passes through a lens array 118 including, for example, one or more rows of graded-index glass micro lenses, such as those depicted in FIG. 1B. The lens array 118 transmits a 1:1 size ratio, non-inverted optical image with minimal peripheral distortion. Accordingly, the distance between the image sensor 112 and the target, T, can be very short. Upon exiting the lens array 118, the reflected light, $L_R$, impinges on the image sensor 112, generating an electrical output signal representative thereof. Since the reflected light, $L_R$, is in the form of a plane, due to the nature of the lens array 118 and the linear light target, T, the output signal is also a function of the resolution of the image sensor 112.

A tracking element such as a wheel 120 (solely a portion of which is visible in this depiction) is journaled for rotation such that the depicted portion of the wheel periphery 122 is exposed for rolling contact on the image. The spatial location of the target, T, is coincident with the wheel periphery 122 generally at maximum radial exposure from a surrounding housing 124. Typically, two wheels 120 are employed in axially spaced relation to provide for stable rolling, although solely one wheel 120 could be used.

Figure 4:
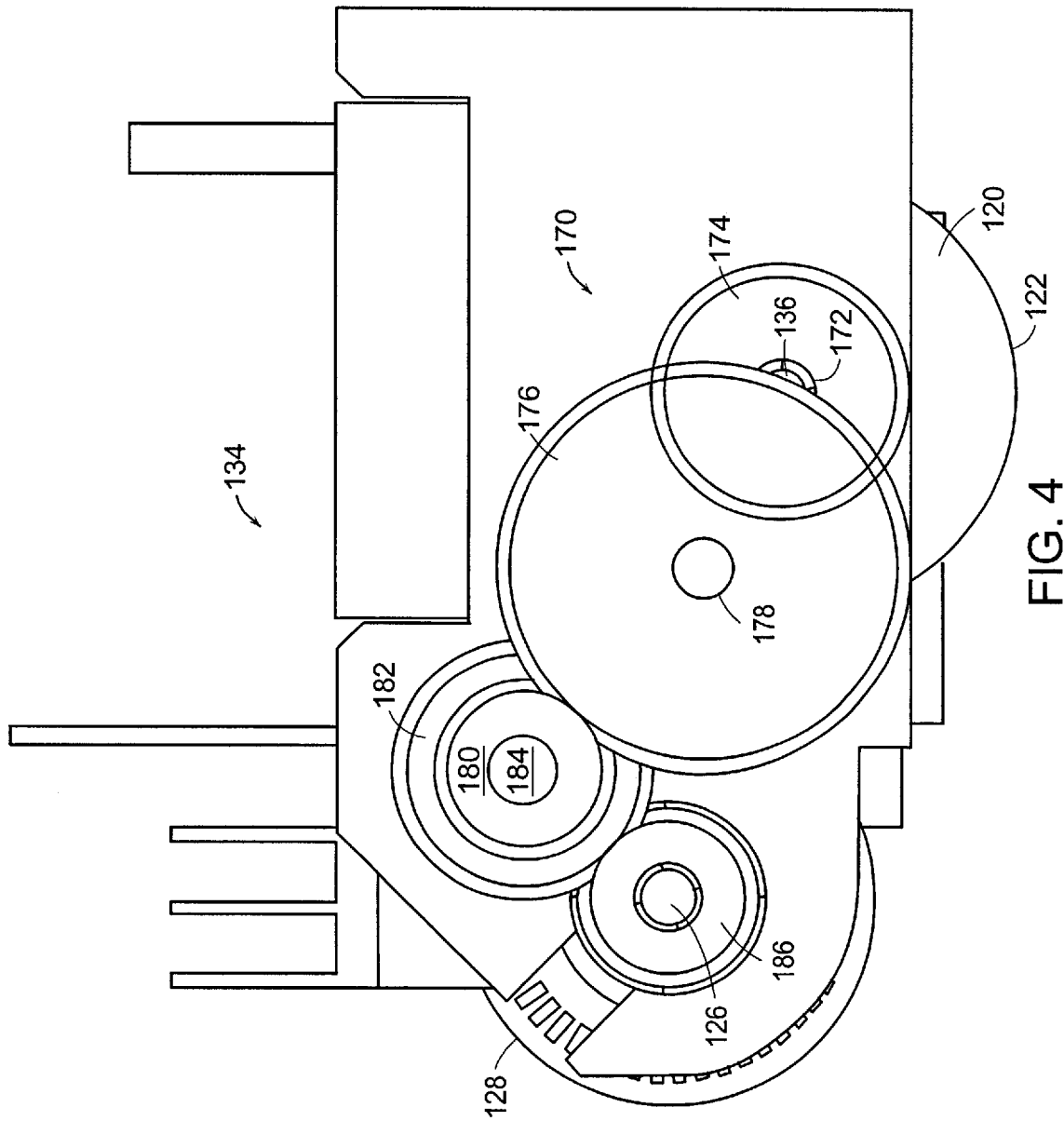
FIG. 4 is an enlarged schematic side view of an image scanning apparatus in accordance with an alternative embodiment of the present invention.

A scanning subassembly 134 includes the image scanning apparatus 100 and apparatus for generating a timing signal representative of the motion of the image scanning apparatus 100 relative to the image. The timing signal is generated by a photo interrupter 132, in cooperation with an optical disk 128 having a plurality of radial slots 130 disposed therein. The optical disk 128 is disposed on a shaft 126 coupled to the wheels 120 by a gear train 170 as depicted in FIG. 4, which is an enlarged schematic side view of the scanning subassembly 134.

The wheel 120, which may be manufactured from rubber or may be fitted with a friction member such as an O-ring along the periphery 122 thereof, rotates about a first shaft 136 which may be supported for rotation by a bearing member 172 of any suitable construction to provide low rotational resistance. Mounted on the shaft 136 is a first gear 174 which drives a small diameter pinion (not depicted) affixed to a second gear 176 mounted for rotation on a first idler shaft 178. The second gear 176, in turn, drives a small diameter pinion 180 affixed to a third gear 182, both of which are mounted for rotation on a second idler shaft 184. The third gear 182, drives a final fourth gear 186 which is mounted on optical disk shaft 126. Accordingly, when the scanning subassembly 134 is rolled across the image, rotation of wheels 120 positively drive rotation of the optical disk 128 through the gear train 170 to generate an accurate timing signal. As mentioned hereinabove, by changing the gear ratio of the gear train 170 or the number of slots 130 in the optical disk 128, the number of lines per inch or resolution of the image scanning apparatus 100 in the travel direction may be varied. Other alternative positive drives are contemplated including, for example, timing belt drives.

Figure 5A:
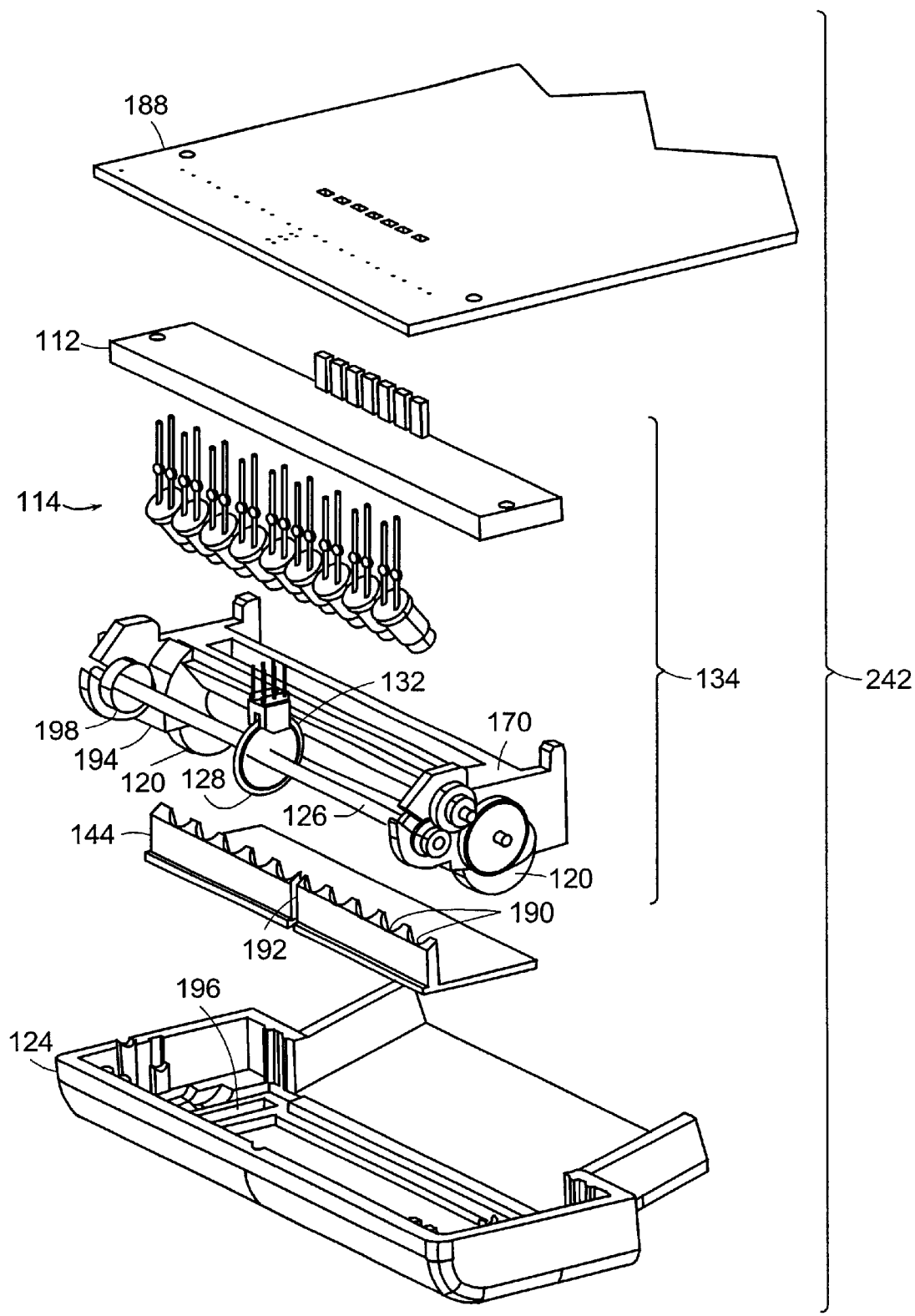
FIG. 5A is an exploded schematic perspective view of a portion of a recording device in accordance with an embodiment of the present invention.
Figure 5B:
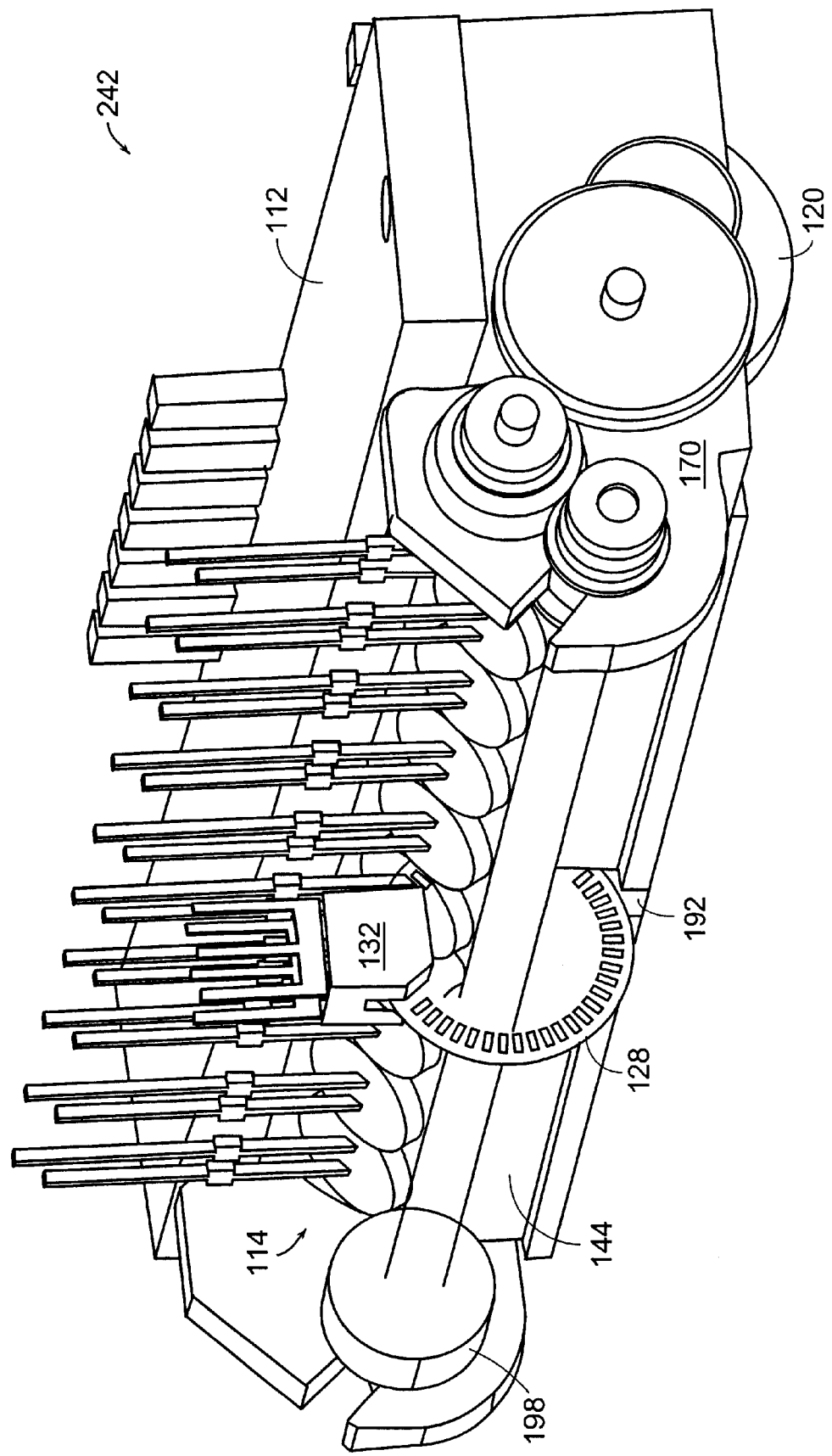
FIG. 5B is a schematic perspective assembly view of the portion of the recording device depicted in FIG. 5A.

FIGS. 5A–5B are schematic perspective exploded and assembly views, respectively, of a portion of a recording device 242 incorporating the gear driven scanning subassembly 134 with the image scanning apparatus 100. In FIG. 5A, the recording device 242 includes the housing 124, the window 144, and a circuit board 188. The circuit board 188 includes a plurality of apertures for mounting of the image sensor 112, such as a photodiode array, and the LED array 114. The depicted LED array 114 includes ten discrete LEDs, although fewer or more may be provided as desired depending on the width of the recording device and the level of target illumination required for a particular image sensor 112. Surface mounted LEDs may also be employed; however, they may not be as bright as discrete LEDs. Molded nesting 190 is provided in the window 144 to position and orient the individual LEDs in the LED array 114, keeping the LEDs from contacting the optical disk shaft 126. The window 144 also forms a slot 192 to prevent interference with the optical disk 128. To prevent moisture and debris from entering the scanning subassembly 134, the wheels 120 may be substantially enclosed in respective fenders 194, solely one of which can be seen in FIG. 5A. Upon assembly, the fenders 194 abut the housing 124 with a limited portion of each wheel periphery 122 passing through respective slots 196 in the housing 124. The scanning subassembly 134 may also include a commutator 198, which is disposed on the optical disk shaft 126, to permit automatic energization of the recording device 242 initiated solely by rotation of the wheels 120 as will be discussed in greater detail with regard to FIG. 9.

Figure 6B:
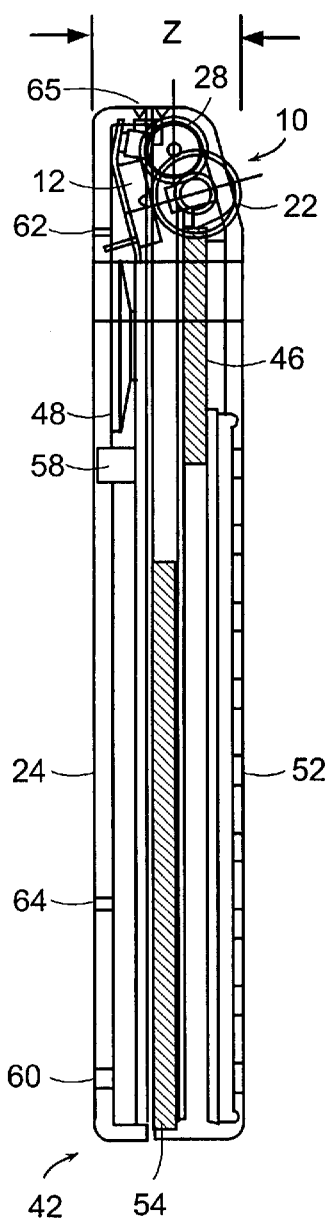
FIG. 6B is a schematic partial phantom left side view of the recording device depicted in FIG. 6A.
Figure 6A:
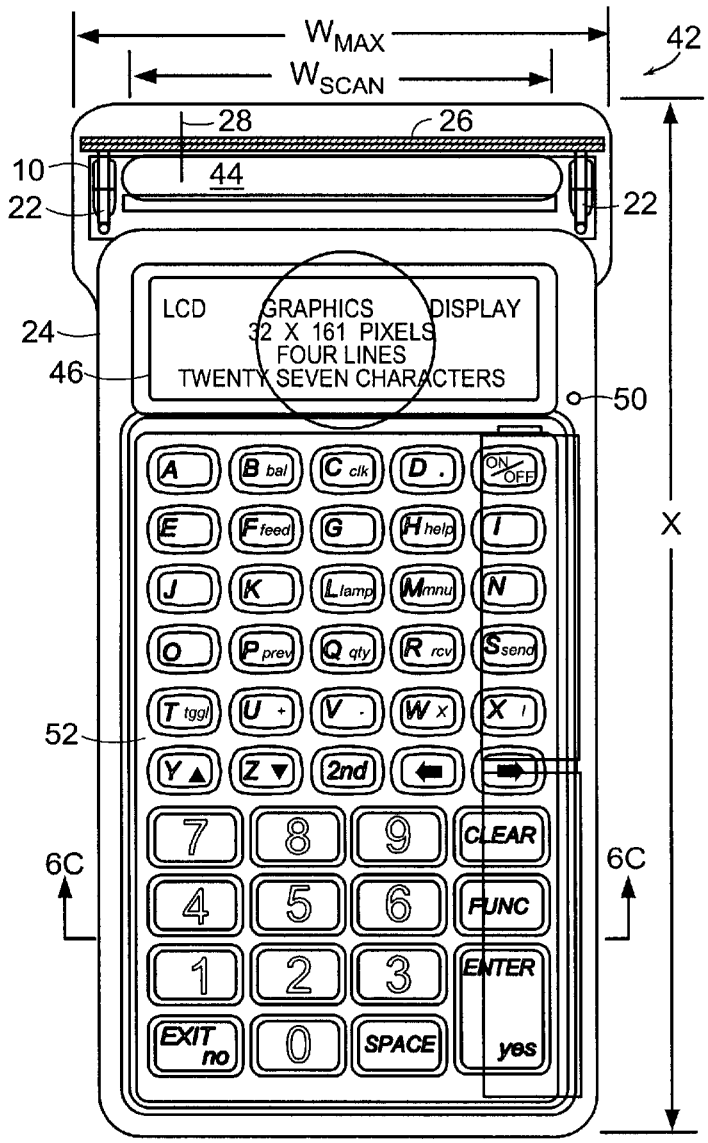
FIG. 6A is a schematic partial phantom plan view of a recording device in accordance with an exemplary embodiment of the present invention.
Figure 6C:
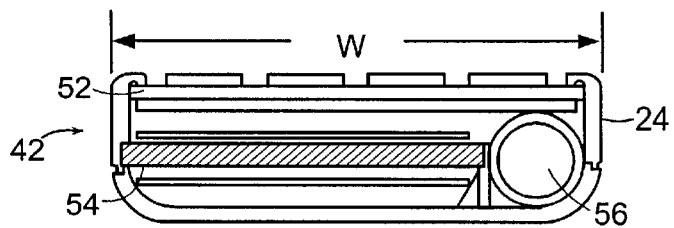
FIG. 6C is a schematic sectional view of the recording device depicted in FIG. 6A taken along line 6C—6C of FIG. 6A.

FIGS. 6A–6B are schematic partial phantom plan and left side views, respectively, of a recording device 42 incorporating the image scanning apparatus 10 in scanning subassembly 34 in accordance with an exemplary embodiment of the present invention. The recording device 42 may alternatively incorporate the image scanning apparatus 100 in scanning subassembly 134. FIG. 6C is a schematic sectional view of the recording device 42 depicted in FIG. 6A taken along line 6C—6C of FIG. 6A. The portable hand-held recording device 42 includes the housing 24 having disposed therein the image scanning apparatus 10 at one end thereof A control system including a microprocessor, memory, and software control algorithms are provided and disposed within the housing 24. Control system architecture and operation will be discussed in greater detail hereinbelow with respect to FIGS. 8–11.

The recording device 42 may be configured as generally prismatic, having mutually orthogonal dimensions of length, X, width, W, and height or thickness, Z. At the end of the recording device 42 incorporating the image scanning apparatus 10, the width may be locally increased to a maximum width, $W_{MAX}$, to accommodate the scanning subassembly 34 while maintaining a generous scanning width dimension, $W_{SCAN}$. The image scanning apparatus 10 is covered by a low distortion optical cover such as an optically clear window 44 to prevent infiltration of dirt and other foreign matter. The window 44 may be manufactured, for example, from polycarbonate and recessed from the surface of the recording device 42 to minimize the likelihood of scratching. The color of the window 44 may be red, for example, to pass the wavelength of the LED light while filtering out most visible light. An outwardly extending ridge or standoff feature traversing the window 44 may also be provided to protect against surface scratching.

Disposed proximate the window 44 is a display 46 which may be a digital format liquid crystal display ("LCD") having a plurality of individually addressable pixels for displaying alphanumeric text, symbols, indicia representing a scanned image, or any other information capable of being represented with such a display. The display 46 may also be recessed and covered with a polycarbonate window for protection against impact damage and breakage. A speaker 48 may be provided behind the display 46 and oriented to transmit aural information out of a reverse side of the recording device 42 from behind a protective grill formed in the housing 24. For example, the speaker 48 may replay recorded voice messages or may emit an audible beep to notify the user to check the display 46. Typical display messages may include status messages such as "low battery voltage," "successful scan," and "unsuccessful scan, try again." A miniature microphone 50 may be provided in a suitable location such as proximate the display 46 to record spoken information. A keyboard 52 including a full set of alphanumeric keys as well as additional symbol or function keys may be provided to facilitate manual data entry such as the user's name or employee code number.

A PCMCIA card 54, or other miniaturized memory card, having mutually orthogonal dimensions of length, $X_C$, and width, $W_C$, as depicted in FIG. 6D, may be disposed in a suitable slot behind the keyboard 52. The memory card 54 may be capable of being grasped by a user for ease of retrieval and replacement or may be enclosed in the housing 24 so as to be generally inaccessible, as desired. Power for the recording device 42 may be provided by one or more batteries 56, which may be of the rechargeable type and which may be disposed in a convenient location such as beside the memory card 54. Two AA size batteries 56 are depicted in FIG. 6A. Desirable battery features include rapid recharge, long life, and low memory effect. Suitable batteries 56 include those manufactured from nickel cadmium, nickel metal hydride, and lithium oxide. A door (not depicted) may be provided in the housing 24 to provide access to the batteries 56 and/or the memory card 54. The recording device 42 may also include an accessory connector 58, as best seen in FIG. 6B, to connect the recording device to an accessory such as a data radio, a printer, or a modem.

Sealed touch electrical contacts 60 may be provided at any suitable location on the housing 24 to facilitate recharging of the batteries 56, for example, by inserting the recording device 42 into a suitable configured slot in a base station or other recharging station. A single LED 62 or other display feature may also be provided on the reverse side of the recording device 42 as an indicator to a user that the recording device 42 is energized and scanning properly, for example, by flashing in consonance with the timing signal generated by the scanning subassembly 34. A communications port 64 may also be provided to facilitate transfer of data, information, and control algorithms between the recording device 42 and a base station or host computer. The communications port 64 may be of the contact variety, requiring physical contact with terminals, or of the non-contact variety such as employed with infrared communications which require physical proximity between an infrared transmitter and receiver. For example, an Infrared Data Association ("IRDA") port 65 may also be provided for wireless bi-directional communication with external devices such as a charging and communications base station or a host computer. Alternatively, the recording device may include an antenna and associated circuitry (not depicted) to support short range radio frequency or similar communication capability.

In an exemplary embodiment, the recording device 42 may have a length, X, of about 6.1 inches, a width, W, of about 2.9 inches and a thickness, Z, of slightly less than 0.9 inches. The maximum width, $W_{MAX}$, may be about 3.2 inches to accommodate a scanning width, $W_{SCAN}$, of about 2.5 inches. The PCMCIA card 56 may have a length, $X_C$, of about 3.4 inches, a width, $W_C$, of about 2.1 inches, and a thickness, as best seen in FIG. 6B, of slightly more than 0.1 inches. The housing 24 may be manufactured in mating front and rear halves of polycarbonate material such as LEXAN® available from General Electric located in Pittsfield, Mass. The housing 24 may have a minimum wall thickness of about 0.1 inches to provide a tough, impact resistant enclosure. O-ring seals may be provided along the housing halves, the scanning window 44, and the display 46 to prevent ingress of water and moisture in the event the recording device 42 in operated in a damp or rainy environment. The volume in which the batteries 56 are disposed may also be sealed to prevent any water or fluids therein from passing into other internal spaces of the recording device 42. The keyboard 52 may be manufactured with sealed rubber keys, to prevent ingress of dirt and moisture, and may also be backed by a lightweight aluminum plate to provide additional stiffness to the housing 24. Overall weight of the recording device, including batteries 56, may be about eight ounces or less to provide for fatigue free operation.

A recording device 142 in accordance with an alternative embodiment of the present invention is depicted in FIGS. 7A and 7B. A more compact arrangement may be afforded, for example, by employing a keyboard 152 which combines both alphabetic and numeric functions on the same keys, for example, by using a "SHIFT" key as is well known by those skilled in the art. The batteries 156 may also be reoriented to partially overlie the PCMCIA card 154, resulting in a slightly thicker recording device 142 than recording device 42 depicted in FIGS. 6A–6C. Additionally, a connector 66 for the PCMCIA card 154 is depicted in FIG. 7B. The recording device 142 depicted in FIGS. 7A–7B includes substantially all of the same structural features and control functionality described with respect to the recording device 42 of FIGS. 6A–6C, the main difference between the two being primarily the arrangement of the elements within the packaging.

In an exemplary embodiment, the recording device 142 may have a length, X, of about 5.6 inches, a width, W, of about 2.3 inches and a thickness, Z, of slightly greater than 0.9 inches. The PCMCIA card 56 may have a length, $X_C$, of about 3.4 inches, a width, $W_C$, of about 2.1 inches, and a thickness, as best seen in FIG. 7B, of slightly more than 0.1 inches. Overall weight of the recording device, including batteries 56, may be about eight ounces or less.

Figure 8:
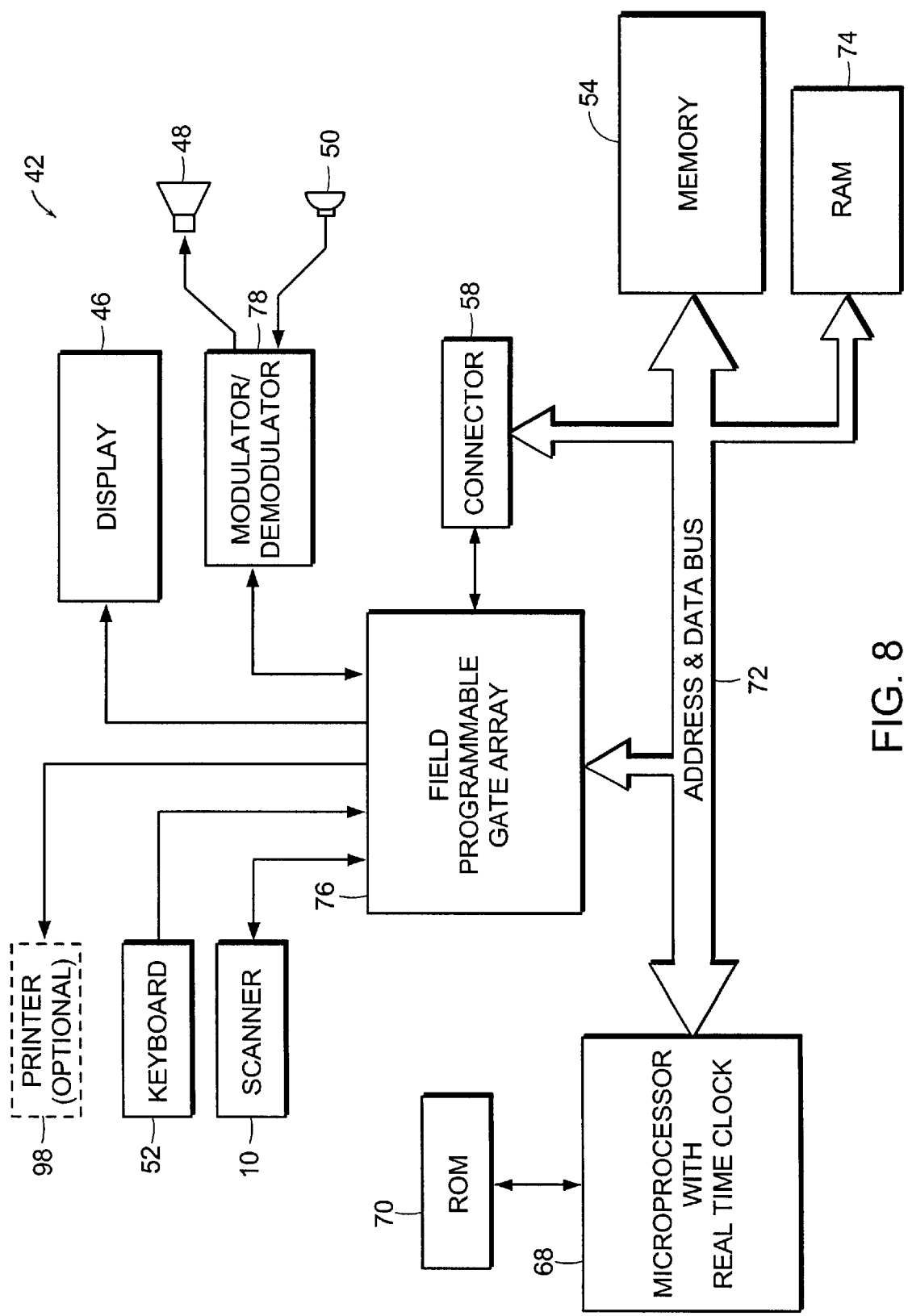
FIG. 8 is a block diagram of recording device control hardware and connections therebetween in accordance with an embodiment of the present invention.

FIG. 8 is a block diagram of recording device control hardware and connections therebetween in accordance with the designation of elements of recording device 42. The recording device 42 includes a microprocessor 68 having an integral real time clock for date stamping information to be stored such as information representative of a scanned image. A memory 70, such as a read only memory ("ROM"), is connected to the microprocessor 68 for storage of unit specific data and information such as LCD contrast setting, unit serial number, repair records, and perhaps a password to allow use by only a single individual. The microprocessor 68 is connected to the rest of the control hardware by means of an address and data bus, shown generally at 72. Control signals are not depicted. The bus 72 is connected to additional memory including, for example, flash memory in the form of a 16 megabyte Type 1 PCMCIA card 54 for storage of information representing a scanned image and random access memory ("RAM") 74 for use by the microprocessor 68 as a scratch pad during performance of data and information processing functions. The accessory connector 58 is also attached to the bus 72 to provide access to the PCMCIA card 54, the RAM 74, and the microprocessor 68.

An FPGA 76 is disposed between the bus 72 and various input devices, such as the keyboard 52, the image scanning apparatus 10, and the microphone 50, and various output devices, such as the display 46, the speaker 48, and an optional printer 98. A modulator/demodulator 78 may be disposed between the FPGA 76 and each of the speaker 48 and the microphone 50 to convert analog audio signals to digital form such as with a continuously variable slope modulator/demodulator ("CVSD"). The accessory connector 58 may also be directly connected to the FPGA 76 to facilitate reprogramming of the FPGA 76 to implement different scanning or data collection algorithms. Reprogramming the FPGA 76 may also be desirable to activate or deactivate one or more of the input and output devices.

The FPGA 76 functions to provide the logic and control signals to connect all peripherals to the microprocessor 68. The FPGA 76 may provide data conditioning logic 80 such as that depicted in FIG. 10, or may, for example, scan the keyboard 52 for input while the recording device 42 is in a low power mode as discussed in greater detail hereinbelow.

Upon sensing that a key has been pressed, the FPGA 76 provides power to the microprocessor 68 and other components. The logic connections within the FPGA 76 may be changed at any time by appropriate software to effect fundamental changes in the functions performed by the recording device 42.

In an exemplary embodiment, the microprocessor 68 is a Motorola MC68341 microprocessor, having a 32 bit internal data word capability and 16 bit input/output ("I/O") capability. Two direct memory access ("DMA") channels are provided, as well as the real time clock. The associated ROM 70 may be a 1024×1 serial electrically erasable programmable read only memory ("EEPROM"). The EEPROM may include information such as an electronic identification number unique to the particular recording device 42 so that unit level identification can be provided whenever information or data is transferred via communications port 64. The bus 72 may be a 26 bit address and 16 bit data bus, with 67 megabytes of address space. The RAM 74 may be a 256 k×8 static random access memory ("SRAM").

The image scanning apparatus 10 may include a 3454×1 CCD array 12 available from Toshiba located in Japan, or alternatively an intelligent opto sensor ("IOS") 512 pixel linear array available from Texas Instruments. An exemplary lens array 18 is a SELFOC® lens array ("SLA") available from NSG America Inc. located in Somerset, N.J. 08873. The SLA includes at least one row of SELFOC® graded-index micro lenses with substantially similar optical properties and geometric dimensions disposed in black silicon resin and aligned precisely between two fiberglass reinforced plates. The lens array 18 transmits a 1:1 size ratio, non-inverted optical image with minimal peripheral distortion. The image scanning apparatus 10 may include a plurality (e.g. ten) surface mounted LEDs available from Ricoh located in Japan to form the LED array 14. The reflective surface 16 may be manufactured from surface aluminized plastic, being designed to provide the proper focusing on the linear target, T, as is known by those having skill in the art of optical design. Alternatively, a lens system may be built integrally into the scanner window 44.

The display 46 may be a 32×128 pixel addressable LCD graphics display, available from Sharp located in Japan to provide up to four lines of 21 characters each, utilizing a 5×7 character matrix size. Alternatively, the display 46 may be a 32×162 pixel addressable LCD graphics display which may be custom manufactured by an LCD manufacturer with custom tooling to provide up to four lines of 27 characters each, utilizing a similar character matrix size. The display 46 may also include a backlight option to facilitate reading of the display 46 in low ambient light conditions. The modulator/demodulator 78 may be of the CVSD variety, such as those available from Motorola located in Phoenix, Ariz. Lastly, the PCMCIA cards 54 may be obtained from Intel located in California.

The recording device 42 may include a three mode power management function to conserve battery power. In a first low power mode, solely the real time clock (with calendar function) in the microprocessor 68 and backup power to the SRAM 74 are active. All other components are switched off. In a second partial power mode, typically activated by depressing the on/off key on the keyboard 52, power is also provided to the photo interrupter 32, the keyboard 52, the FPGA 76, and the display 46. The image scanning apparatus 10 is in standby mode and the microprocessor 68 remains in an off state. If no additional actions are taken, the recording device 42 will revert to the first low power mode after a programmable time-out period, for example 30 seconds. Instead of being activated by depressing the on/off key, the partial power mode may be activated by a contact closure from a device such as the commutator 198 mounted on the optical disk shaft 26 so that the partial power mode is entered automatically whenever the recording device 42 is rolled across an image. In a third full power process mode, the microprocessor 68 becomes energized whenever another key is depressed or the image scanning apparatus 10 requires processing. The image scanning apparatus 10, however, is only energized when the recording device 42 senses rotation of the tracking wheels 22. Accordingly, the LED array 14 is only energized when the recording device 42 is being employed to scan an image. No special triggering of the image scanning apparatus 10 is required by the user.

Figure 9:
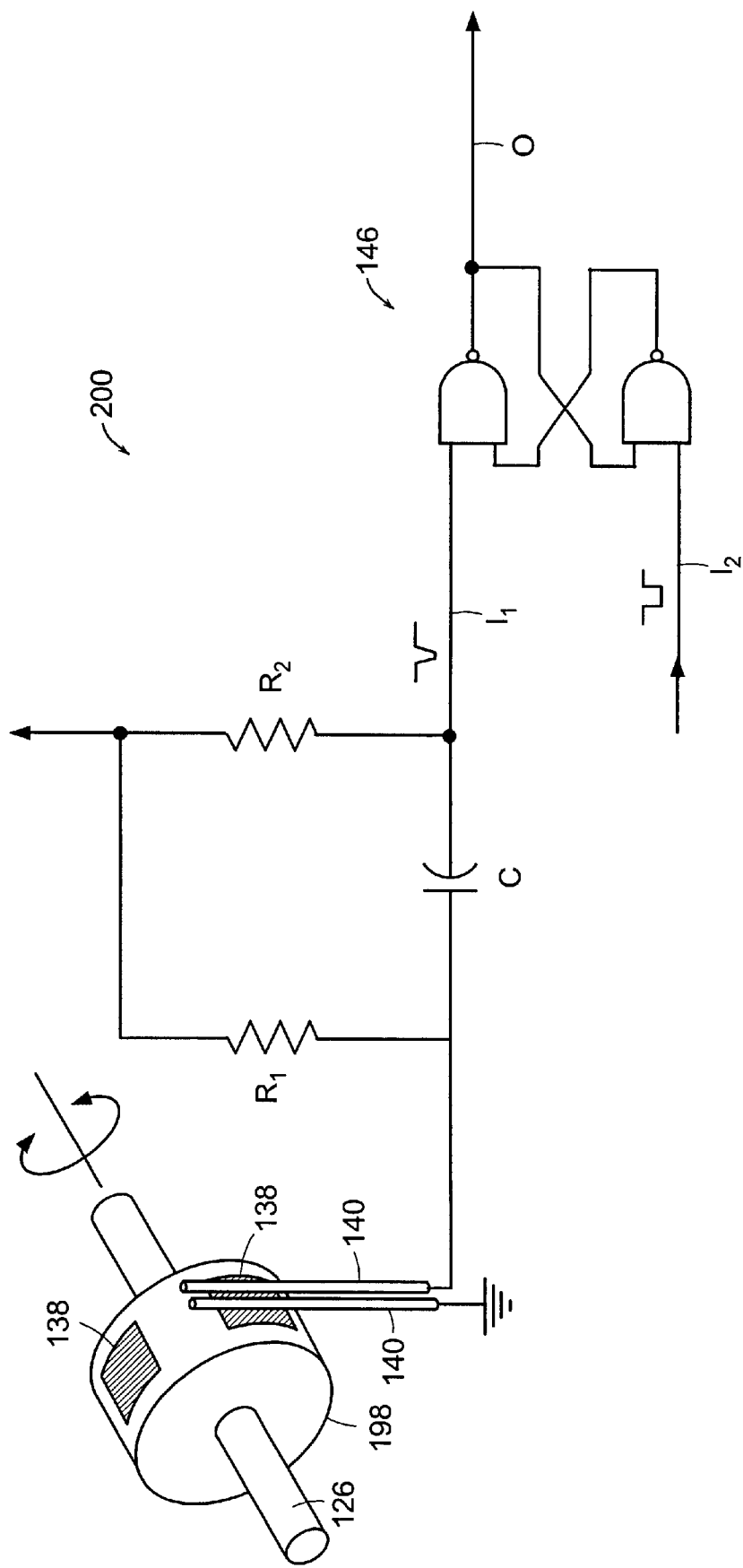
FIG. 9 is a schematic of a commutator contact closure and associated circuitry in accordance with an embodiment of the present invention.

FIG. 9 is a schematic of the commutator 198 mounted on optical disk shaft 126 and associated circuitry 200 which may be employed to permit the recording device 42 to automatically enter the partial power mode whenever the recording device 42 is rolled across an image to be scanned. The commutator 198 may be configured as a generally cylindrical member having one or more electrically conductive regions 138 disposed about a periphery thereof. Interdisposed regions are electrically insulative. Resiliently biased against the periphery of the commutator 198 is a pair of spring wire contacts 140, one of which is connected to electrical ground and the other to a voltage source, V, through a resistor, $R_1$, of the circuitry 200. The voltage source, V, may be battery voltage or any reference voltage within the recording device 42. The circuitry 200 further includes a flip flop, shown generally at 146, which includes two cross coupled NAND gates wired as shown to exhibit two stable states. CMOS NAND gates may be employed to conserve battery power due to their very low power consumption. A first input, $I_1$, of the flip flop 146 is connected to the voltage source, V, through a second resistor, $R_2$, and is also connected to the ungrounded wire contact 140 through a capacitor, C. The other input, $I_2$, of the flip flop 146 may be connected to the microprocessor 68. The output, O, of the flip flop 146 is used to switch the power to the recording device 42 on and off similar to the on/off switch. In an exemplary embodiment, the resistors, $R_1$, $R_2$, may each have a value of 1 MΩ and the capacitor, C, may have a value of 100 pF.

With the recording device 42 in the low power mode, a user need not press the on switch of the keyboard 52 to enter the partial power mode. Rather, the user need only begin rolling the wheels 120 of the recording device 42 along an image to be scanned. As soon as the wheels 120 begin to turn, the optical disk shaft 126 and commutator 198 also rotate. When the wire contacts 140 contact a conductive region 138, the first input, $I_1$, goes low, dropping to a voltage near ground or zero volts, and the flip flop output, O, goes high, turning on power to additional components such as the photo interrupter 32 as discussed hereinabove. When scanning and data processing has been completed, the microprocessor 68 drives the second flip flop input, $I_2$, low to turn power off. Other circuits may be designed by those skilled in the art to achieve similar results based upon the closure of spring contacts 140 or other contacts in the scanning subassembly 134 triggered by rotation of the wheels 120, as taught herein.

Figure 10:
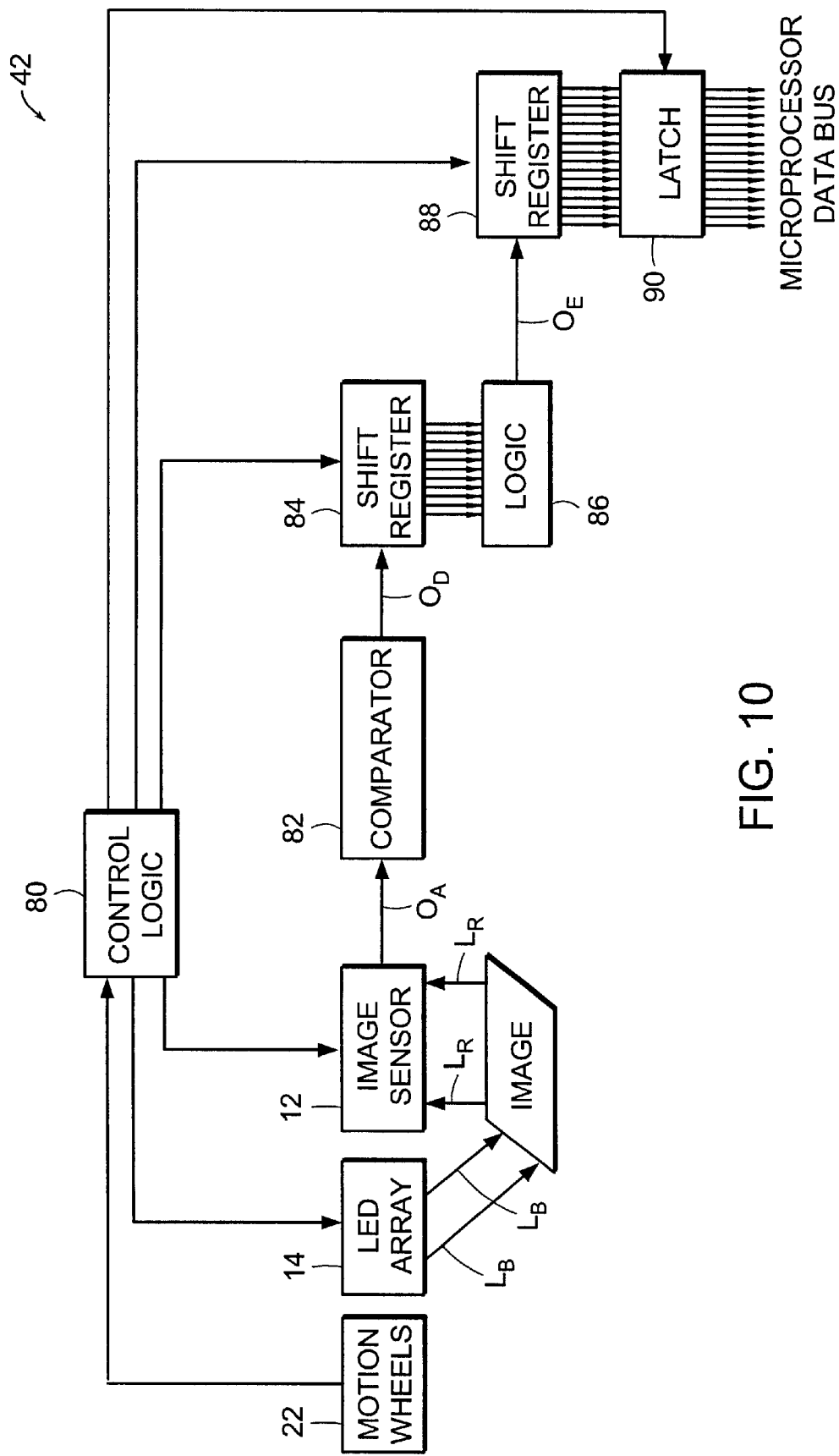
FIG. 10 is a block diagram of an exemplary recording device control scheme.

Referring now to FIG. 10, depicted therein is a block diagram of an exemplary control scheme for use with the recording device 42. Control logic 80, typically located in the FPGA 76, controls the scanning of an image and generation and storage of information representative of the image. As the recording device 42 is rolled across the image on the wheels 20, the control logic 80 detects wheel rotation and energizes the LED array 14 under control of the timing signal generated by the scanning subassembly 34. A typical scan resolution may be about 200 scan lines per inch in the travel direction with a single LED array flash per scan line. Depending on the desired resolution and the nature of the image being scanned, scan rates as low as 10 scan lines per inch or lower or as high as 800 scan lines per inch or higher are contemplated and considered to be within the scope of the present invention. The light beams, $L_B$, are focused on the image and reflected light, $L_R$, is transmitted to the image sensor 12 by the lens array 18.

Analog output signal, $O_A$, of the image sensor 12 passes through a black/white threshold comparator 82. The threshold level of the comparator 82 may be set by the microprocessor 68 based, for example, on the average analog output of the image sensor 12, or other relevant parameter of interest or combinations thereof The threshold level may also be set or adjusted manually by a user using the keyboard 52. If additional resolution over black and white is desired, the comparator 82 could be an eight bit AID converter with, for example, 256 discrete threshold levels, as desired. For black and white resolution, the comparator 82 converts the analog output signal, $O_A$, to a digital output signal, $O_D$, which passes through a variable size shift register 84 in order to reduce the resolution of the image sensor 12, if desired, to conserve memory space. The parallel output of the shift register 84 passes through majority logic 86 which processes each shift register group to produce a single one or zero bit, $O_E$, rendering an exemplary transverse resolution of 512 pulses per scan line for a scan line of about 2.56 inches in transverse length. This resolution corresponds to 200 pulses per inch, similar to the selected resolution in the travel direction. Greater or lesser transverse resolution may be provided as desired depending on the desired resolution and nature of the image being scanned. For example, transverse resolution scan rates as low as 10 pulses per inch of scan line or lower or as high as 800 pulses per inch of scan line or higher are contemplated and considered to be within the scope of the present invention.

The output bits, $O_E$, from majority logic 86 enter a sixteen bit shift register 88 and thereafter a sixteen bit data bus latch 90. The output of the data bus latch 90 is connected to the microprocessor data bus 72 where it is written via a DMA channel to the appropriate memory location for storage, for example, a memory location on the RAM 74. By passing the logic output through the sixteen bit shift register 88 and latch 90, the 512 pulse per scan line information representative of the scanned image is able to be stored as thirty-two, sixteen bit data words per scan line for each of the 200 scan lines per inch of the image in the travel direction. Logic for the comparator 82, the shift register 84, the majority logic 86, the shift register 88, and the data bus latch 90 may be stored advantageously with the control logic 80 in the FPGA 76.

Figure 11:
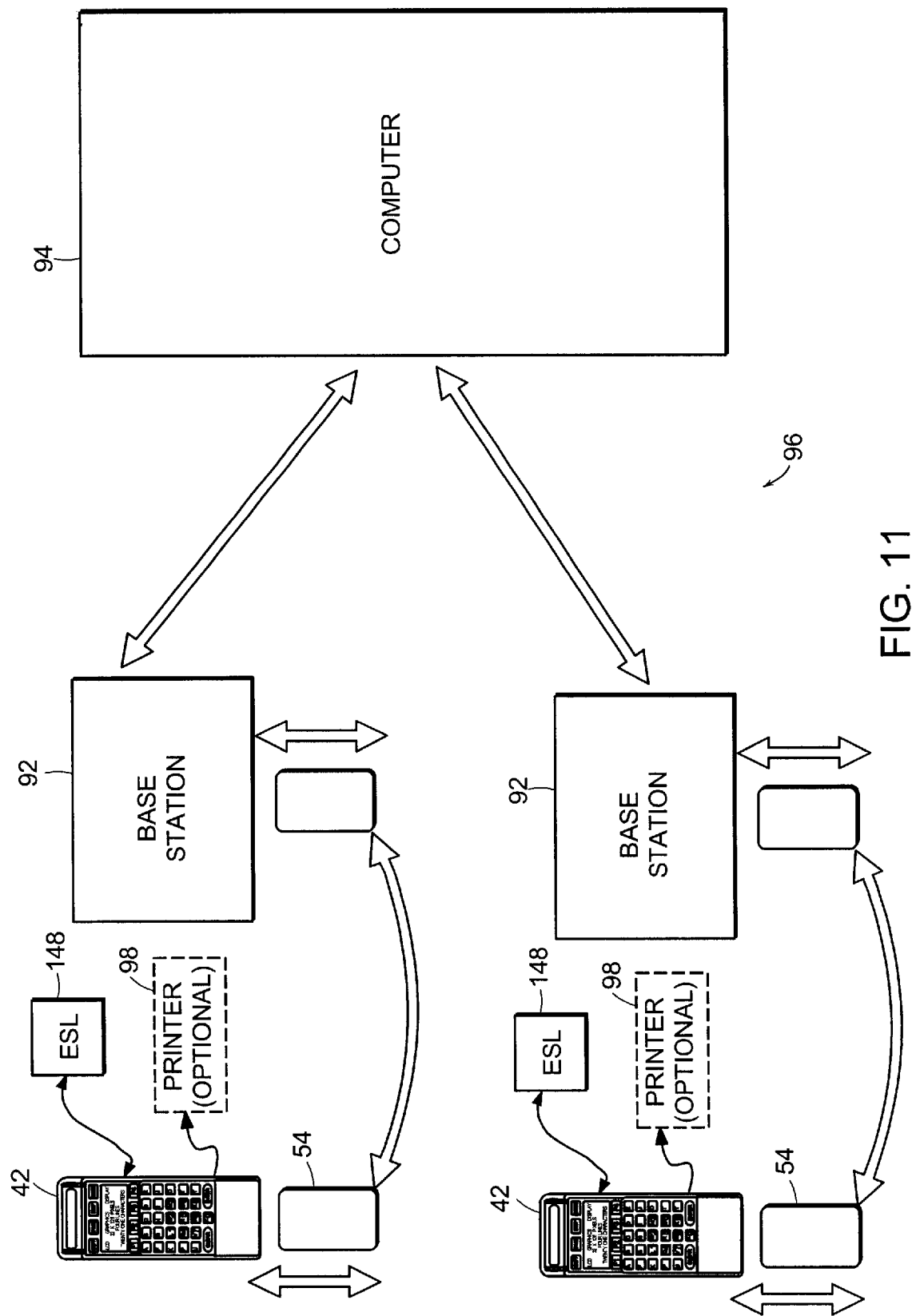
FIG. 11 is a block diagram of an recording system in accordance with an exemplary embodiment of the present invention.

Once the information representative of an image has been generated and stored in the recording device 42, capability is provided to upload the information to a base station 92 and/or a host computer 94 or transmit the information to a printer 98. An image recording system 96 including at least one recording device 42, and one base station 92 is depicted in FIG. 11. Different configurations for the system 96 are contemplated. For example, the image recording system 96 depicted in FIG. 11 employs a plurality of image recording devices 42 with individually removable PCMCIA cards 54. The cards 54 are removed from the image recording devices 42 and loaded into any of a plurality of base stations 92 where information stored on the cards 54 is uploaded to the base stations 92. Alternatively or additionally, information stored in the base stations 92 may be downloaded to the cards 54. The base stations 92 communicate with a host computer 94, for example using a local area network ("LAN") or a modem and telephone lines, to upload information stored in the base stations 92, including information representative of scanned images uploaded thereto from the recording devices 42. Information stored in the host computer 94 may also be downloaded to the base stations 92 and ultimately to the recording devices 42 via the cards.

In an image recording system according to an alternative embodiment, the PCMCIA cards 54 remain in respective recording devices 42. Each recording device 42 is configured to be received in a slot in a base station 92. Once received in a base station 92, data communication between the base station 92 and recording device 42 may take place. Additionally, the base station 92 may include a power supply and associated circuitry for recharging the batteries 56 in each recording device 42, as necessary.

According to the teachings of this invention, a portable hand-held image recording device 42 and system 96 may be implemented to improve tracking of and verify receipt of goods and services. The recording device 42 is small enough and lightweight enough to be carried in a shirt pocket and is capable of accurately reading all standard width-modulated bar code formats including I 2 of 5, USS-128, Code 39, maxicode, and PDF417 at better than a 99% read success rate. Additionally, the recording device 42 is capable of reliably capturing images such as signatures and 2-D data codes.

In an exemplary application, a two inch wide adhesive label with a unique bar code may be affixed to a parcel to be sent via a courier service from the sender's location to the addressee's location. The sender fills out pertinent information in designated regions on the label including, for example, the name, address, and zip code of each of the sender and addressee. The sender may also check off boxes such as "Signature required" and "Return receipt requested." Once the label has been completed by the sender, the entire label is scanned by the recording device 42 and the information stored therein. At an appropriate time, the stored information is uploaded to the base station 92 and host computer 94.

The handwritten image in the zip code region may be processed by -character recognition algorithms and, in combination with the unique bar code, may be employed to automate routing of the parcel to the addressee. Upon delivery of the parcel, the addressee signs the label in a designated signature region and the entire label is scanned again by another recording device 42 and the information stored and uploaded. In the event the sender checked off the "Return receipt requested" block, a receipt showing all information on the label, including the addressee's signature can be printed automatically at the sender's location for local delivery. No manual entry of data is required by the courier service at any step in the process. Accordingly, manual data entry errors are eliminated.

As discussed hereinabove, the PCMCIA card 54 can be used as a memory card. Alternatively, the PCMCIA card 54 may be used as a radio card for transmitting information to and receiving information from another PCMCIA card 54 configured as a radio card and operating at the same frequency. Accordingly, instead of having to physically remove the PCMCIA card 54 from the recording device 42 and insert the card 54 in the base station 92 or insert the recording device 42 in a slot in the base station 92, the card 54 in the recording device 42 may communicate wirelessly with a corresponding card located in the base station 92 via the IRDA port 65.

Accordingly, in another exemplary application, the recording device 42 may be part of the system 96 depicted in FIG. 11 to update wirelessly information stored on electronic shelf labels 148. Electronic shelf labels 148 are programmable display devices typically employed in retail sales locations such as supermarkets which display relevant product information such as price information. For this application, the recording device 42 may be used to scan a bar code label or other identifying indicia on a product such as a box of breakfast cereal displayed on a shelf outfitted with an electronic shelf label 148. The recording device 42 may then upload information representative of the scanned image wirelessly via the IRDA port 65 to the base station 92 located, for example, overhead in the ceiling of the supermarket. The base station 92 may then download selected information directly to the recording device 42 or alternatively may communicate with the host computer 94 which downloads to the base station 92 and ultimately the recording device 42 certain information such as price information which may be displayed on the display 46. If the price information displayed on the recording device display 46 is different than that displayed on the electronic shelf label 148, the recording device 42 may be used to update the price information displayed by the electronic shelf label 148 via the IRDA port 65. In applications where printed shelf labels are used to identify product prices instead of electronic shelf labels 148, a shelf label with the new price information could be printed automatically by the optional printer 98 connected to the recording device 42.

By employing the image scanning apparatus 10 instead of conventional optical components, the recording device 42 exhibits exceptional shock and vibration capability. All of the image sensor 12, LED array 14, and lens array 18 can be readily aligned and ruggedly mounted. Further, the individual optical elements or micro lenses 19 in the lens array 18 are integrally mounted in a parallel arrangement, unlike conventional optical components which include a plurality of separate lenses serially disposed along a contiguous light path. Such conventional components, whether mounted in a tube or otherwise, are subject to dislocation, misalignment, and breakage due to jarring, vibration, and shock rendering such components generally inappropriate for exemplary applications disclosed herein.

While there have been described herein what are to be considered exemplary and preferred embodiments of the present invention, other modifications of the invention will become apparent to those skilled in the art from the teachings herein. The particular methods of manufacture of discrete components, geometries, and interconnections therebetween disclosed herein are exemplary in nature and not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. Apparatus for scanning an image, the apparatus comprising:
   an image sensor;
   a lens array disposed between the image sensor and the image to be scanned;
   a light source for illuminating the image; and
   a subassembly for incrementally scanning discrete portions of the image, wherein the scanning subassembly regulates energization of the light source in accordance with movement of the image sensor relative to the image, the scanning subassembly comprising:
      a tracking element for indicating movement of the image sensor relative to the image, wherein the tracking element comprises:
         a wheel configured for rolling contact on the image; and
         an optical disk coupled to the wheel; and
      a switch for switching the light source in accordance with the movement.

2. The invention according to claim 1 wherein the optical disk is coupled to the wheel by a gear drive.

3. The invention according to claim 1 wherein the optical disk is coupled to the wheel by a friction drive.

4. The invention according to claim 1 wherein the tracking element further comprises a photo interrupter which straddles the optical disk.

5. A portable hand-held device for recording an image, the device comprising:
   a housing having disposed therein:
      apparatus for scanning an image, the image scanning apparatus comprising:
         an image sensor;
         a lens array disposed between the image sensor and the image to be scanned;
         a light source for illuminating the image; and
         a subassembly for incrementally scanning discrete portions of the image;
      a contact closure for entering a second power mode from a first power mode.
   wherein the contact closure comprises a commutator coupled to the scanning subassembly;
      a microprocessor for receiving output from the image scanning apparatus
   representative of the image;
      memory connected to the microprocessor for storing information; and
      software stored in the memory for controlling operation of the microprocessor.

6. A system for recording an image comprising:
   a portable hand held device for recording and storing information representative of an image associated with a product;
   an electronic shelf label; and
   a base station for communicating with the device for uploading the stored information representative of an image associated with the product, wherein the device;
      records the information representative of an image associated with the product;
      communicates with the base station to receive information related to the product; and
      wirelessly communicates the information related to the product to the electronic shelf label,
      wherein the information representative of an image associated with the product is from a source other than the electronic shelf label.

7. The invention according to claim 6 wherein:

the recording device includes a rechargeable source of power; and the base station includes a power supply for charging the source of power.

8. The invention according to claim 6 wherein the base station is capable of downloading information to the recording device.

9. The invention according to claim 6 further comprising a host computer for communicating with the base station for uploading information stored in the base station.

10. The invention according to claim 9 wherein the host computer is capable of downloading information to the base station.

* * * * *